United States Patent [19]

Pontier et al.

[11] Patent Number: 5,449,496

[45] Date of Patent: Sep. 12, 1995

[54] DOWNFLOW FLUID CATALYTIC CRACKING PROCESS AND APPARATUS

[75] Inventors: Renaud Pontier, Vienne; Frederic Hoffmann, Paris; Pierre Galtier, Vienne, all of France

[73] Assignee: Institut Francais Du Petrole, Rueil Malmaison, France

[21] Appl. No.: 204,822

[22] Filed: Mar. 2, 1994

Related U.S. Application Data

[62] Division of Ser. No. 770,265, Oct. 3, 1991, Pat. No. 5,344,554.

[30] Foreign Application Priority Data

Oct. 3, 1990 [FR] France .................. 90 12275

[51] Int. Cl.⁶ ............................................. F27B 15/10
[52] U.S. Cl. ..................................... 422/144; 422/145; 422/147
[58] Field of Search ............... 422/144, 145, 147, 143; 406/20-22

[56] References Cited

U.S. PATENT DOCUMENTS

| | | | |
|---|---|---|---|
| 2,781,234 | 2/1957 | Boisture et al. | 422/144 X |
| 2,965,454 | 12/1960 | Harper | 422/144 |
| 3,850,582 | 11/1974 | Luckenbach | 422/144 |
| 3,963,603 | 6/1976 | Bunn, Jr. et al. | 208/164 |
| 4,035,153 | 7/1977 | Bunn, Jr. et al. | 23/288 B |
| 4,062,759 | 12/1977 | Castagnos, Jr. et al. | 208/113 |
| 4,327,055 | 4/1982 | Luckenbach et al. | 422/144 X |
| 4,385,985 | 5/1983 | Gross et al. | 208/113 |
| 4,453,865 | 6/1984 | Norton | 406/24 |
| 4,459,071 | 7/1984 | Norton et al. | 406/108 |
| 4,514,285 | 4/1985 | Niccum et al. | 422/144 X |
| 4,532,026 | 7/1985 | Fries | 208/164 |
| 4,793,913 | 12/1988 | Chessmore et al. | 208/113 |
| 4,824,557 | 4/1989 | Cartmell et al. | 208/146 |
| 4,849,091 | 7/1989 | Cabrera et al. | 208/113 |
| 4,902,407 | 2/1990 | Chan et al. | 208/152 |
| 5,081,039 | 1/1992 | Buttke et al. | 436/55 |
| 5,106,587 | 4/1992 | Gartside et al. | 422/144 |
| 5,106,799 | 4/1992 | Green et al. | 502/43 |

FOREIGN PATENT DOCUMENTS 2655053 4/1994 France .

*Primary Examiner*—Timothy M. McMahon
*Attorney, Agent, or Firm*—Millen, White, Zelano & Branigan

[57] ABSTRACT

The invention relates to a downflow fluid cracking process and apparatus, particularly suitable for use in the catalytic cracking of heavy hydrocarbon charges. More specifically, removal of at least partly regenerated catalyst, which must be recycled to the reactor 1 from a dense phase 17a contained in a regenerator 17, and the introduction of the catalyst into the upper part 3 of the reactor 1 takes place under conditions such that the density of the thus formed gas-solid suspension is between 80 and 500 kg/m³ prior to its contacting with the charge, which is introduced by the injectors 5.

13 Claims, 3 Drawing Sheets

DOWNFLOW FLUID CATALYTIC CRACKING PROCESS AND APPARATUS

This is a divisional of application Ser. No. 07/770,265, filed Oct. 3, 1991 (now U.S. Pat. No. 5,344,554).

BACKGROUND OF THE INVENTION

The invention relates to a process for catalytic cracking, more specifically a process for treating heavy hydrocarbon oils, as well as an apparatus permitting the performance of this process.

The evolution of the nature of crude oil supplies, as well as the reduction in demand for products refined into fuel oils compared with lighter products of the petroleum type have led the oil refining industry to develop various processes making it possible to valorize natural heavy oils, as well as residual oils such as atmospheric distillation residues or vacuum distillation residues.

With respect to the catalytic cracking processes using such charges, it has been found that the main difficulties are due to the fact that these charges contain organic materials such as asphaltenes, as well as condensed polycyclic aromatic hydrocarbons, which are difficult to crack into lighter molecules to provide high yields of fractions boiling at lower boiling points, but which tend to associate in order to give rise to large coke formations, which are deposited on the catalysts used and reduce their activity. Moreover, the presence in these heavy oils of large quantities of heavy metals, such as, e.g. nickel, vanadium, iron, etc., is considered to be prejudicial, because these metals tend to poison or at least deactivate the zeolite-type catalysts generally used in existing fluid catalytic cracking processes, referred to as F.C.C.

A certain number of essential factors can still make it possible to convert heavy products into lighter fractions with a good selectivity, while keeping coke formation to a minimum.

Among these factors, one of the most important consists of ensuring, with respect to the contacting of the hydrocarbon charge (which is generally preheated and to which is optionally added steam) and the regenerated hot catalyst used in the catalytic cracking unit, a mixture such that the heat transfer between the charge and the catalyst is carried out as rapidly as possible and as regularly as possible. It is also vital for the renewal of the regenerated catalyst that the introduction of the charge into the reaction zone is carried out permanently and efficiently, while in particular avoiding retro-mixing phenomena, which increase the contact times and lead to a significant reduction in the formation of light fractions by increasing the percentage by weight of coke formed on the catalyst grains.

Another important phenomenon, which is also prejudicial to the satisfactory operation of a F.C.C. unit, more particularly intended for the treatment of heavy charges, involves of the difficulty of obtaining a good radial homogeneity of the catalyst, both at the start of the reaction zone and all along the reaction zone.

With regards to the selectivity of the cracking reactions in general terms, it is known that it improves as the flow of fluids approaches a piston-type flow, which is particularly difficult to obtain in conventional F.C.C. units.

The present invention aims at simultaneously obtaining the optimum conditions for achieving the three aforementioned factors, namely the absence of retro-mixing, radial homogeneity and a piston-type flow. This objective can be achieved in a reaction zone traversed by a co-current of charge and catalyst in the falling or downward direction, the catalyst being brought to a well defined fluidization level prior to its contact with the charge.

Among the F.C.C. processes described in the prior art and using a downward co-current reactor in the reaction zone, certain processes are intended for the treatment of conventional charges such as vacuum gas oils. U.S. Pat. No. 2,420,558 describes such a method, but only uses a single regeneration zone of the catalyst. U.S. Pat. No. 2,965,454 describes an apparatus, whose reaction zone is constituted by a plurality of vertical tubes traversed in falling co-currents of charge and catalyst. U.S. Pat. No. 3,835,029 also relates to a falling co-current F.C.C. process, which is only applicable to light charges (entirely vaporizable between 510° and 550° C.), whose introduction takes place in the vapor phase below the introduction of the catalyst into the reaction zone, when the speed of the catalyst is between 9 and 30 m/s.

These methods are not suitable for heavier hydrocarbon charges, because the choice of such a high catalyst speed makes it necessary for the charge to be completely vaporized prior to contact therewith. However, the introduction of a heavy charge in the vaporized state would necessarily be accompanied by an undesired thermal cracking (coke formation).

U.S. Pat. No. 4,385,985 describes an improved downflow catalytic cracking process making it possible to treat heavy charges, which have a boiling point above 560° C. and a Conradson carbon content equal to or higher than 3%. However, the system, consisting of introducing the catalyst from a dense phase in the form of a flow of particles with an uncontrolled apparent density, does not permit a homogeneous distribution of the catalyst with respect to the injection and consequently a complete, fast vaporization of the charge throughout the entire reactor cross-section.

The prior art can also be illustrated by U.S. Pat. No. 4,532,026.

However, none of the aforementioned apparatuses makes it possible to bring about an appropriate heavy hydrocarbon injection into a catalytic cracking reaction zone, while ensuring both a rapid mixing (below preferably 500 milliseconds) of the catalyst and the charge vaporized on contact therewith, an increase in the heat exchange coefficient and a good radial mixing homogeneity over the entire surface of the reactor.

Therefore the present invention relates to a novel F.C.C. process (fluid catalytic cracking) obviating the aforementioned disadvantages and which is more particularly usable for the transformation of heavy hydrocarbon charges. Thus, the charges can either be conventional charges, e.g., having final boiling points of approximately 400° C., such as vacuum gas oils, as well as heavier hydrocarbon oils, such as crude and/or stripped oils, together with vacuum distillation or atmospheric distillation residues. If appropriate, these charges may have had a prior treatment such as, e.g. a hydrotreatment in the presence of cobalt-molybdenum type catalysts. The preferred charges according to the invention are those containing fractions normally boiling up to 700° C. and higher, which can contain high percentages of asphaltene products and which have a Conradson carbon content up to 4% and above. These charges may or may not be diluted by conventional lighter fractions, which can include hydrocarbon fractions which have already undergone the cracking operation, but which are recycled, such as, e.g. light cycle oils (L.C.O.) or heavy cycle oils (H.C.O.). According to the preferred embodiment of the invention, these charges are preheated in a temperature range between 100° and 250° C. prior to their treatment.

In general terms, the invention relates to a fluid catalytic cracking process for a hydrocarbon charge in a reaction zone, which is preferably substantially vertical, in which the charge and the catalyst circulate in top to bottom, co-current manner, the process involving a stage of supplying at least partly regenerated catalyst to the upper end of the reaction zone, a stage of introducing and atomizing the charge in an introduction zone located below the catalyst supply zone to the upper part of the reaction zone, a stage of contacting the catalyst and the charge in the upper part of the reaction zone, a stage of circulating the catalyst and the charge in the reaction zone during which the cracking of the charge takes place under appropriate cracking conditions and the catalyst is at least partly deactivated by depositing coke thereon, a stage of separating and stripping the deactivated catalyst from the cracked hydrocarbon charge in a separation zone at the lower end of the reaction zone, a stage of regenerating at least part of the deactivated catalyst in at least one regeneration zone and a stage of recycling the at least partly regenerated catalyst into a recycling zone upstream of the upper end of the reaction zone, characterized in that a) during the recycling stage, the at least partly regenerated catalyst is sampled from a dense phase,
b) the stage of supplying catalyst to the upper end of the reaction zone takes place in the presence of at least one fluidization gas and a suspension of catalyst and gas is obtained,
c) the density of the suspension is measured by appropriate measuring means upstream of the charge introduction zone and
d) by adequate means, adjustment and regulation takes place of the flow rate of the fluidization gas upstream of the charge introduction zone under conditions such that the density of the gas-solid suspension formed in this way is between 80 and 500 kg/m$^3$ prior to its contacting with the charge.

The aforementioned operating conditions are very close to those recommended in configurations with a riser. Therefore, the heat exchange coefficient between the catalyst and the heavy charge is increased and the distribution of catalyst in accordance with a radial plane is more homogeneous. This leads to a faster vaporization of the charge, which contributes to a better petroleum fraction selectivity, which is increased if retromixing phenomena are minimized. Despite the type of heavy charges treated, there is a reduced coke deposition on the catalyst.

The fluidization conditions can be such that the velocity of the catalyst prior to its contacting with the charge is between approximately 2 and approximately 8 m/s. According to a particularly advantageous feature, prior to its contact with the charge the catalyst can have an apparent density in the solid-gas suspension of 200 to 300 kg/m$^3$ and a velocity of 3 to 5 m/s.

Under these conditions the best results are obtained, particularly with regard to the heat exchange coefficient between the catalyst and the heavy charge, which is consequently more rapidly vaporized.

It is also preferable to regenerate the catalyst, deactivated by the coke deposited during the cracking reaction, in two regeneration zones. This catalyst is first fed into a first regeneration zone, where it is partly regenerated, then fed into a second regeneration zone at a higher temperature generally between 650° and 900° C. and preferably between 750° and 800° C. and the thus regenerated catalyst is recycled at a temperature of, e.g., 800° C. to the cracking reaction zone.

According to a first embodiment of the process, the recycling zone is rising overall and the rising speed of the catalyst is generally 5 to 20 m/s as a result of appropriate fluidization means.

According to another advantageous feature of the invention, the recycling zone of the catalyst can comprise, downstream of the rising zone, a dense fluidized bed storage zone where the regenerated catalyst is made to flow out. It is sampled from the dense bed and is then made to circulate from the storage zone to the upper part of the reaction zone under conditions such that its apparent density in the suspension is 80 to 500 kg/m$^3$ prior to contacting with the atomized charge, the fluidization of the catalyst being ensured by at least one fluidization means located at an outlet of a tube from the storage zone upstream of the cracking reaction zone. Under these fluidization conditions, the velocity of the catalyst can reach 2 to 8 m/s.

According to a second embodiment of the process, the recycling zone can be downward and the catalyst is advantageously sampled from the dense fluidized bed of the second regenerator and flows towards the reaction zone under the aforementioned speed and apparent density conditions as a result of a fluidization means preferably located at an outlet of the tube leading to the cracking reaction zone.

The separation of the catalyst and the cracking effluent can, e.g., be carried out in two ways:

according to a first variant, it is possible to separate the deactivated catalyst from the cracked charge by gravity in the separation zone and then a cyclone separation stage is performed on at least part of the catalyst entrained by the effluent and a cracking effluent is recovered;

according to a second variant, it is possible to separate in the separation zone the deactivated charge from the cracked charge by carrying out, at the outlet from the reaction zone, a cyclone separation stage relative to all the catalyst and effluent and a cracking effluent is recovered.

The invention also relates to an apparatus in particular for performing the process. More specifically, it comprises a preferably substantially vertical, elongated tubular reactor or dropper appropriate for the cracking of the charge in catalytic, co-current top to bottom manner and having an upper end and a lower end, the upper end having means for the introduction and atomization of the charge, means for the introduction of the catalyst located upstream of the charge introduction and atomization means, at least one separating enclosure connected to the lower end of the reactor containing primary separation means of the deactivated catalytic particles from the cracked charge, secondary separation means by steam stripping of most of the catalyst entrained by the cracked charge located in the lower part of the separating enclosure and at least one cracked charge or reaction effluent recovery means, the apparatus also having at least one deactivated catalyst regenerator having an inlet connected to the lower part of the separating enclosure and means for recycling the at least partly regenerated catalyst located between a lower outlet of the regenerator and the upper end of the reactor, characterized in that the recycling means (26b,21) have in combination at least one means (30) for fluidizing the catalyst by an appropriate gas for bringing the catalyst to an appropriate apparent density upstream of the charge introduction and atomization means (5) and checking and regulating means (28) suitable for cooperating with the fluidization means.

The length of the reactor can be 6 to 20 times its diameter starting from the charge introduction point and is preferably 10 to 15 times. It can be defined in such a way as to determine the residence time required by the desired degree of conversion and without modifying the elevation of the unit.

According to another feature, the charge introduction means are located at a distance from the fluidization means corresponding to 1 to 5 and advantageously 2 to 3 times the reactor diameter.

According to an apparatus variant, the recycling means can comprise a substantially vertical, elongated column, whose lower end is connected to the lower part of the second regenerator by a connecting tube and whose upper end is connected to the upper end of the reactor, the lower end of the column having at least one gas fluidization member cooperating with the regulating and checking means.

According to a more advantageous variant, the recycling means incorporate a substantially vertical, elongated column, whose lower end is connected to the lower part of the second regenerator by a connecting tube, whose upper end is connected to a storage enclosure able to operate in a dense fluidized bed as a result of secondary fluidization means located in the lower part of the enclosure, the lower end of the column having at least one first gas fluidization member, the storage enclosure having in its lower part an outlet tube connected to the upper end of the reactor, which has at least one gas fluidization means cooperating with the checking and regulating means.

The introduction means are known injectors arranged symmetrically in the injection section and which are conventionally directed towards the axis of the reactor under an angle advantageously between 20° and 50° with respect to the vertical. They are able to supply liquid droplets having a diameter generally between 50 and 100 micrometers and which have a velocity of, e.g., 50 to 100 ms, as a result of the medium pressure atomization steam normally introduced in a proportion of 2 to 10% by weight, based on the charge and preferably 4 to 6% by weight.

According to the main feature of the invention, the regulating and checking means of the fluidization means are described in French patent application 89/15600 and comprise:

a) at least one ionizing radiation source and at least one detector of ionizing radiation, the source and detector being positioned at a level which is downstream, in the displacement direction of the solid, of the introduction level of the solid, so as to make it possible to measure the mean density of the moving solid, according to at least one predetermined direction substantially perpendicular to the displacement direction of the charge or in at least one given zone between the source and the receiver, b) means able to regulate a fluidization fluid flow valve, c) means, which are, e.g., in the form of programmable calculations, which make it possible on the basis of the acquisition of the value of the density, in at least one predetermined direction or in at least one given zone and at a given time, to carry out the cracking of the hydrocarbon charge under predetermined, stable conditions, by comparison with reference values of the various parameters, which are, e.g., stored in the programmable calculating means and by continuously or periodically adjusting the fluidization fluid flow rate on the basis of the means b).

The use of an ionizing radiation source and a detector for ionizing radiation positioned in the same plane, on either side of the reaction zone and at a chosen level, preferably in the immediate vicinity and upstream of the charge injectors makes it possible by measuring the variation of the absorption of (said variation being directly linked with the variation of the density of the solid at the location of the measurement) to check and, e.g., maintain the density between two previously chosen extreme values. It is possible to carry out a series of measurements in a series of directions in the same plane and thus obtain a distribution cartography of the density of the solid in the measurement plane. Such a cartography can be carried out with the same mobile assembly, constituted by the source and detector, or with the aid of several sources and several detectors. The ionizing radiation source can be positioned outside the reaction zone or inside the downward reaction zone, e.g., in the vicinity of its periphery. The same applies regarding the radiation detector. Preferably, the source and detector are positioned outside the reaction zone.

It is possible to use any emitter of ionizing rays having an adequate emission power estimated as a function of the characteristics of the equipment used. The radiation source used is normally an alpha, beta, gamma or X radiation source, or a neutron source. Most frequently use is made of a gamma radiation source, such as, e.g., a conventional sealed cesium 137 or cobalt 60 source. The power of the sources used is approximately 1 to 100 Curies. The radiation detector is usually a conventional ionizing radiation-sensitive detector, such as, e.g., a photomultiplier or an ionization chamber.

The precise position or positions of the ionizing radiation source or sources and the corresponding detector or detectors, e.g., between the introduction zone of the solid incorporating catalytic particles and the introduction zone of the hydrocarbon charge, can easily be determined, particularly as a function of the size of the reaction zone and the average density chosen for the entrained fluidized bed under the conditions used.

According to an apparent density determination method, it is possible to use a pair of pressure transducers (P1,P2), which are spaced, e.g., by the distance of the diameter of the reactor and are positioned in accordance with the generatrix of the cylindrical cracking reactor between the fluidization means and the charge injector.

The recorded pressure differences are linked by the static pressure drop equation with the density of the suspension by the relation $$\Delta P = P_2 - P_1 = M_V g h$$

$M_V$ density (kg/m$^3$)
g gravitational acceleration (m/s$^2$)

h distance separating the two pressure transducers (m)

ΔP pressure drop (Pa).

The pressure drop is compared by a microcomputer with a reference pressure drop and the microcomputer supplies, as a result of this comparison, a signal permitting an at least partial opening or closing of the fluidization means.

Within the scope of the present invention no mention is made of the type of catalysts used, or the various fluidization fluids, which are of a conventional nature and are well known in the art. Preferably, use is made of steam and zeolitic catalysts, at least one inert gas or gaseous hydrocarbons as the fluidization fluid, both in the rising column and in the falling column prior to the reaction zone.

BRIEF DESCRIPTION OF THE DRAWINGS

The invention will be better understood from the following description given in non-limitative manner of the process and apparatus used with reference to the attached drawings, wherein.

DETAILED DESCRIPTION OF THE DRAWINGS

Figure 1:
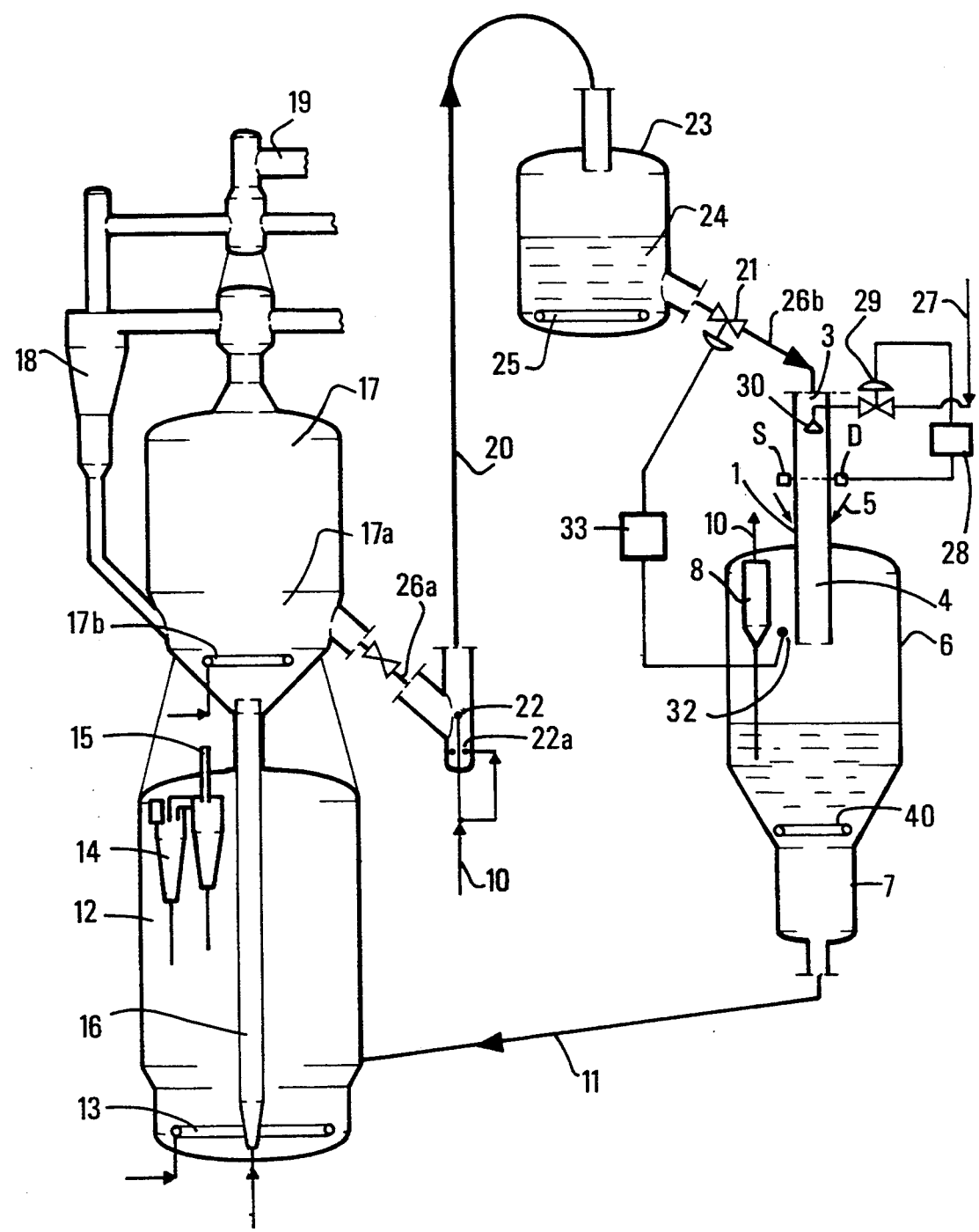
FIG. 1 illustrates a fluid catalytic cracking unit with two regeneration zones and a downflow cracking reactor (dropper) supplied with catalyst from a dense bed storage enclosure connected to a rising column coming from the dense bed of the second regenerator and FIG. 2 shows the case where the reactor is directly supplied by the falling path from the dense bed of the second regenerator.

According to FIG. 1, the apparatus has an elongated, tubular reactor 1 (preferably 8 to 10 times its diameter and substantially vertical), whose upper part 3 is supplied with at least partly regenerated zeolitic catalyst supplied by a line 26b. The catalyst is contacted with a heavy hydrocarbon charge having a high boiling point close to 700° C. and introduced at a distance from a catalyst fluidization means corresponding to three times the reactor diameter by injectors 5 symmetrically distributed around the reactor. These injectors atomize the charge into the form of fine droplets as a result of medium pressure steam (25 bars) and direct the beam of droplets substantially towards the axis of the reactor and towards the bottom thereof at a velocity between 10 and 100 m/s. Thus, the catalyst and atomized charge flow in co-current manner towards the lower end 4 of the reactor at a velocity close to 10 m/s. The charge is then cracked under appropriate conditions and in a very short time of approximately 1 s.

The lower end of the reactor issues into a separating enclosure 6, where separation takes place by gravity of most of the catalyst and a cracking effluent from the charge. The deactivated catalyst accumulates in the form of a dense fluidized bed maintained by appropriate means 40, in the lower part 7 of the enclosure, where in counter-current and in the presence of steam a separation takes place by stripping of the hydrocarbons remaining on the catalyst. The distance between the level of the dense bed and the lower end of the reactor is generally between 3 and 10 times and preferably 5 and 7 times the reactor diameter. A cyclone separator 8 having a leg 9 immersed in the dense fluidized bed of the separating enclosure 6 completes the separation of the entrained catalyst effluent and the latter is recovered at the upper outlet of the enclosure 6 by a line 10.

From the lower separator end 7, the catalyst, deactivated by coke deposited during the cracking reaction, is transferred by a line 11 and a transfer gas to a first regenerator 12, where, in a dense fluidized bed and under appropriate combustion conditions in the presence of a gas containing oxygen supplied by a line 13, part of the coke deposited on the catalyst is burned. This is carried out at a temperature of approximately 500° to 750° C. and is performed with reduced oxygen concentrations chosen so as to bring about the combustion of at least 50% of the hydrogen contained in the coke deposited on the catalyst and so as to burn part of the carbon (10 to 60% by weight of the carbon present).

A cyclone separating system 14 is located in the upper part of the first regenerator in order to separate the catalyst entrainments from the CO-rich combustion gases, the latter being extracted by a line 15. The partly regenerated catalyst, whose coke contains little hydrogen is extracted from the dense fluidized bed of the first regenerator by a rising column 16 and is passed into the lower part 17a of a second regenerator 17, where, under appropriate second regeneration conditions in a dense fluidized bed, the second catalyst regeneration takes place.

This generally takes place at a temperature exceeding 650° C. and below 900° C., substantially in the absence of steam. The oxygen quantity introduced by a fluidization ring 17b is adequate to maintain a high temperature regeneration operation by combustion of coke, combined with a substantially complete combustion of CO into $CO_2$. Thus, on the heavy charges recommended by the invention, weight percentages as low as 0.05% coke have been measured on the regenerated catalyst. Cyclone separators 18 generally located outside the second regenerator, due to the temperature levels reached, make it possible to separate the combustion effluents from the regenerated catalyst, the former being recovered by a line 19.

According to a first embodiment of the apparatus of FIG. 1, a discharge pipe for the catalyst 26a or a connecting tube from the dense fluidized bed of the second regenerator and at a temperature of approximately 800° C. leads the catalyst to the base of an elongated, vertical, rising column 20. The discharge pipe issues between a first fluidizing member 229, which is generally a ring aerating the catalyst and a second member 22 above the ring and which imparts to the catalyst circulating in the column an energy generally corresponding to a velocity of 5 to 20, preferably 3 to 10 ms. The apparent density in the column is approximately 50 kg/m³. The first fluidizing member is located at the base of the rising column, while the second is, e.g., located at a distance from the arrival side of the discharge pipe in the rising column of 1 to 5 times the diameter of the latter. Both are supplied by at least one gas, such as steam, an inert gas or gaseous hydrocarbons. The second fluidizing member is conventionally constituted by at least two upwardly directed, substantially symmetrical, gas supply lines, so as to bring about a catalyst-gas co-current. These two lines, e.g., define an angle of 50° relative to the vertical.

The length of the rising column is generally 3 to 90 times its diameter and advantageously 10 to 25 times its diameter. In the upper part, the column issues into a storage enclosure 23, which is formed by a dense fluidized bed 24 moved through a fluidizing ring 25 by a gas like that described hereinbefore.

From the dense fluidized bed emanates an outlet tube 26b, which connects the storage enclosure 23 to the upper part 3 of the cracking reactor 1. At least one fluidization means 30 supplied by at least one fluidizing gas 27 described hereinbefore and connected to a fluid flow valve 29 brings about a flow of the catalyst at a concentration or apparent density in the gas-solid suspension of 200 to 300 kg/m$^3$ and with a velocity of approximately 3 m/s, prior to its contact with the charge atomized by the injectors. The latter are advantageously located at a point at a distance from the upper end of the reactor (start of the vertical part) corresponding to approximately 6 times the reactor diameter.

The density is measured in a direction substantially perpendicular to the axis of the cracking reactor 1. The ionizing radiation source S is positioned upstream of the injectors 5 of the charge, outside the reactor, and the radiation which has traversed the reactor containing the moving solid is recovered by a detector D. The signal is fed into a programmable processing member 28, which checks and regulates the fluidization fluid flow valve 29 by reference to a previously displayed set point.

Figure 2:
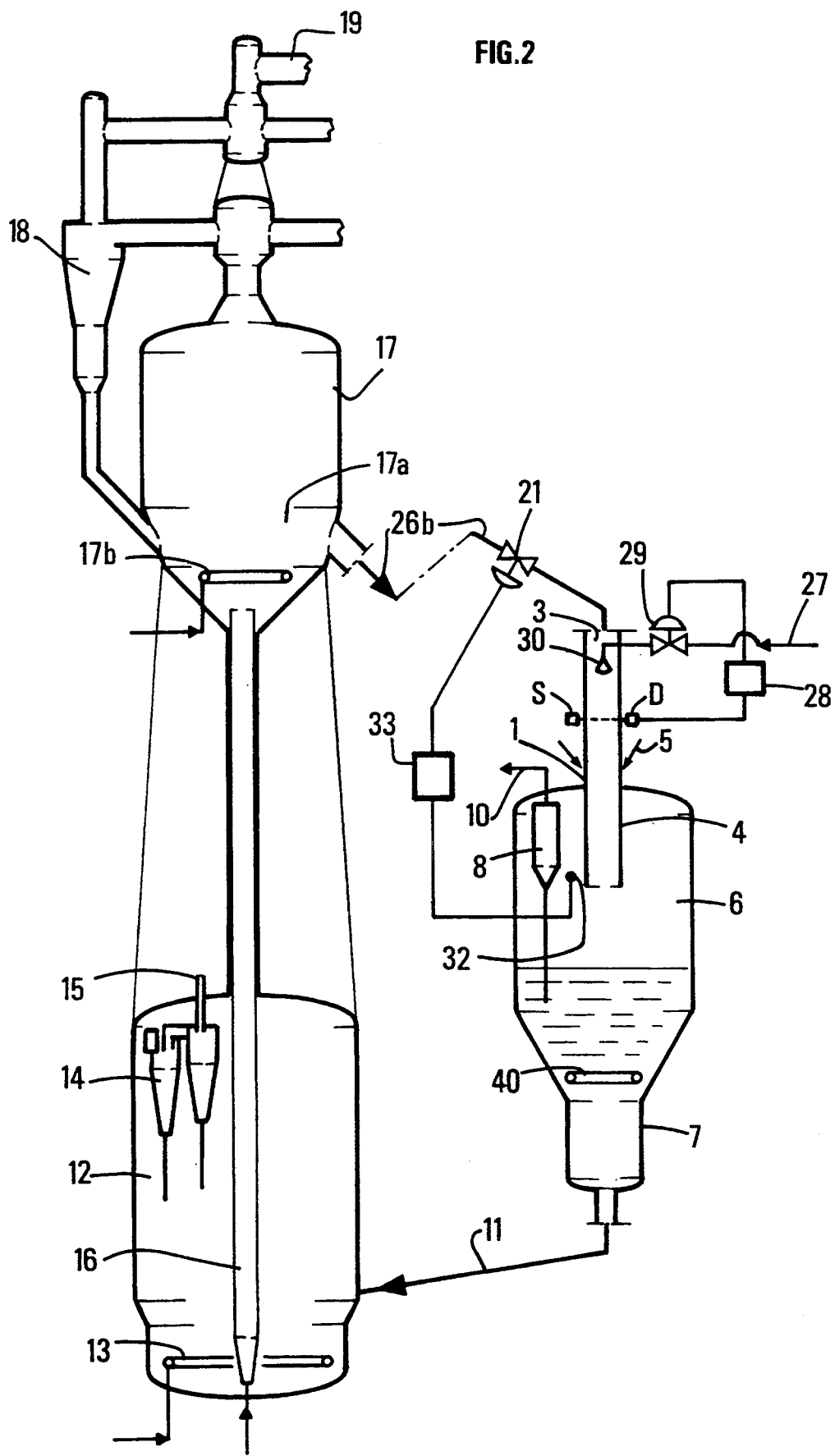
Figure 3:
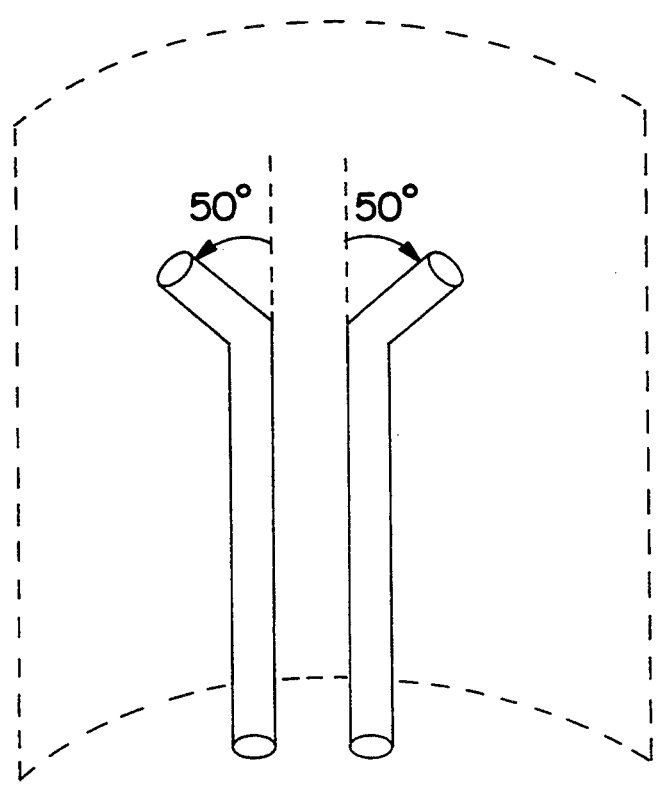
FIG. 3 shows the gas supply lines of the second fluidizing member.

According to another embodiment illustrated by FIG. 2, the sampling of the regenerated catalyst takes place directly in the dense fluidized bed not by the storage enclosure 23, but by the second regenerator 17 as a result of the pipe 26b, which lowers the catalyst directly into the upper end 3 of the reactor 1.

The catalyst is fluidized under density conditions according to the invention as a result of the fluidization means 30, either in the form of an injection sprinkler rose, or perforations made directly along the pipe, connected to the opening or closing fluidization fluid flow valve 29 supplied by the line 27. As described hereinbefore, said valve is connected to a microcomputer 28 operating as in FIG. 1 and which receives a signal supplied by the detector D, the latter receiving ionizing radiation emitted by the source S. The source S and the detector D, as in FIG. 1, are located on either side and externally of the reactor 1 and upstream of the charge injectors and preferably along a line, according to which the measured density value of the moving catalyst is substantially equal to the mean value of the density, calculated over the entire plane of the section.

Within the scope of the present invention, no mention is made of the operating parameters of the unit, which are of a conventional nature. Thus, it is, e.g., well known that the temperature of the cracking effluents measured at the outlet of the cracking reactor by a probe 32 is directly related to the flow of regenerated catalyst flowing from the dense fluidized bed of the second regenerator and which is ensured by a valve 21, which is controlled by means 33 for checking the flow rate connected to the probe 32.

Moreover, a description has been given of a gravity separation stage of the catalyst and the effluent completed by a secondary separation stage by cyclone separation of only part of the catalyst, which has not been separated from the effluent. Obviously, it is also possible to carry out the separation stage by feeding all the deactivated catalyst into at least one large cyclone separator, whose inlet is connected to the lower end of the reactor and whose outlet leg is immersed in the dense phase of the stripping separating means, the cyclone separator having another outlet for the effluent to be recovered.

The following example illustrates the invention and is carried out under the conditions indicated below:

Charge: Arabian heavy atmospheric residue (370° C.+) d=0.990
T° C. catalyst: 800° C.
T° C. charge: 200° C.
Catalyst/charge ratio: 6
Fluidization fluid: gaseous hydrocarbons ($C_1-nC_4$)
Charge droplet diameter: 80 micrometers.

| Suspension density kg/m$^3$ | Vaporization time (ms) | |
|---|---|---|
| | (dropper) | (riser) |
| 700 | 1.5 | 2 |
| 500 | 0.8 | 1 |
| 300 | 0.5 | 0.7 |
| 100 | 0.4 | 0.6 |
| 50 | 1.2 | 1.5 |

The vaporization time is determined by temperature profiles on the basis of the charge introduction point.

We claim:

1. An apparatus for fluid catalytic cracking of a hydrocarbon charge and regeneration of deactivated catalyst comprising:

an elongated tubular reactor wherein a charge can be catalytically cracked in co-current manner and from top to bottom, said elongated tubular reactor having an upper end and a lower end, said upper end having charge introduction and atomizing means and catalyst introduction means upstream of said charge introduction and atomizing means;

at least one separating enclosure connected to said lower end of said tubular reactor, said separating enclosure having an upper part, a lower part, means for primary separation of deactivated catalytic particles from cracked charge, means for secondary separation by steam stripping of catalyst entrained by cracked charge located in said lower part of said separating enclosure, and at least one means for recovery of cracked charge;

at least one deactivated catalyst regenerator having a lower part, an upper part, and an inlet connected to said lower part of said separating enclosure; and means for recycling at least partly regenerated catalyst to said tubular reactor, said means for recycling being located between a lower outlet of said regenerator and said upper end of said tubular reactor, said apparatus further comprising at least one fluidizing means within said reactor for fluidizing catalyst to bring catalyst to a desired apparent density upstream of said charge introduction and atomizing means, and means for checking and regulating apparent density of catalyst, said means for checking and regulating being capable of cooperating with said at least one fluidizing means to adjust apparent density of catalyst.

2. An apparatus according to claim 1, wherein said apparatus has a first regenerator having an upper part and a lower part and a second regenerator having an upper part and a lower part, said separating enclosure is connected to said first regenerator and said recycling means is connected to the lower part of said second regenerator.

3. An apparatus according to claim 2, wherein said recycling means comprises a substantially vertical, elongated column having an upper end and a lower end, said lower end of said column is connected to said lower part of said second regenerator by a connecting tube, said upper end of said column is in fluid communication with said upper end of said reactor, said lower end of said column having at least one gas fluidizing member.

4. An apparatus according to claim 2, wherein said recycling means comprises a substantially vertical, elongated column having an upper end and a lower end, said lower end of said column is connected to said lower part of said second regenerator by a connecting tube, said upper end of said column is connected to a storage enclosure containing a dense fluidized bed through secondary fluidization means located in the lower part of said storage enclosure, said lower end of said column having at least one gas fluidizing member, said lower part of said storage enclosure having an outlet tube connected to said upper end of said reactor.

5. An apparatus according to claim 3, wherein said elongated column comprises a first fluidizing member and a second fluidizing member, said first fluidizing member being located at the bottom of said column and said second fluidizing member being located at a distance of 1 to 5 times the column diameter above the arrival side of said connecting tube.

6. An apparatus according to claim 3, wherein the length of said elongated, vertical column is between 3 and 90 times its diameter.

7. An apparatus according to claim 2, wherein said recycling means comprises an outlet tube connected to said lower part of said second regenerator and connected to said upper end of said reactor.

8. An apparatus according to claim 1, wherein the length of said reactor, starting from said charge introduction and atomizing means, is 6 to 20 times its diameter.

9. An apparatus according to claim 1, wherein said charge introduction and atomizing means is located at a distance from said fluidizing means corresponding to 1 to 5 times the reactor diameter.

10. An apparatus according to claim 1, wherein said separating enclosure contains a dense bed and said separating enclosure contains at least one cyclone separator able to receive through an inlet effluent to be recovered and part of catalyst entrained by effluent, the distance between the level of said dense bed and said lower end of said reactor being between 3 and 10 times the reactor diameter, said cyclone separator having an entrained catalyst outlet leg connected to said means for secondary separation by steam stripping.

11. An apparatus according to claim 1, wherein said separating enclosure comprises at least one cyclone separator having an inlet connected to said lower end of the reactor and and an outlet leg is connected to said means for secondary separation, said cyclone separator having another outlet for discharge of effluent to be recovered.

12. An apparatus according to claim 1, wherein said means for checking and regulating comprises on either side of said reactor, at least one ionizing radiation source and at least one detector for said radiation which are positioned between said fluidizing means and said charge introduction and atomizing means and valve means for regulating flow of fluid to said fluidizing means said detector and valve means being connected to a microcomputer which, by reference to set point, supplies a signal controlling opening and closing of said valve means.

13. An apparatus according to claim 1, wherein said means for checking and regulating comprises a pair of pressure transducers, positioned between said fluidizing means and said charge introduction and atomizing means, and valve means for regulating flow of fluid to said fluidizing means said pressure transducers and valve means being connected to a microcomputer which, by reference to a set point, supplies a signal controlling opening and said valve means.

* * * * *